United States Patent [19]

Blumhardt

[11] Patent Number: 5,479,495
[45] Date of Patent: Dec. 26, 1995

[54] METHOD AND SYSTEM FOR AUTOMATICALLY ACCESSING AND INVOKING SWITCH-BASED SERVICES IN AN ADVANCED INTELLIGENT NETWORK

[75] Inventor: Mark S. Blumhardt, Niwot, Colo.

[73] Assignee: U S West Advanced Technologies, Inc., Boulder, Colo.

[21] Appl. No.: 130,477

[22] Filed: Oct. 1, 1993

[51] Int. Cl.$^6$ ............................................. H04M 3/42
[52] U.S. Cl. ................................. 379/207; 379/201
[58] Field of Search ............................ 379/142, 257, 379/265, 266, 112, 67, 115, 207, 201, 219, 225, 212, 216, 202, 203, 96, 62, 124, 209

[56] References Cited

U.S. PATENT DOCUMENTS

| | | | |
|---|---|---|---|
| 4,878,240 | 10/1989 | Lin et al. | 379/67 |
| 5,268,957 | 12/1993 | Albrecht | 379/209 |
| 5,272,748 | 12/1993 | Davis | 379/201 |
| 5,311,574 | 5/1994 | Livanos | 379/209 |
| 5,311,583 | 5/1994 | Friedes et al. | 379/209 |

*Primary Examiner*—Jeffery A. Hofsass
*Assistant Examiner*—Scott Wolinsky
*Attorney, Agent, or Firm*—Timothy R. Schulte; Stephen F. Jewett; Judson D. Cary

[57] ABSTRACT

A method and system is provided for use in an Advanced Intelligent Network (AIN) for automatically accessing and invoking existing switch-based services without going off-hook. To be operative, the Advanced Intelligent Network must be equipped with O-called-party-busy trigger and leg manipulation functionality such as in AIN release 1.0 architecture and have at least one service node or suitable switch in electrical communication with a plurality of central offices via a suitable signaling protocol such as Transaction Capability Application Part (TCAP) protocol. The switch or service node must be operative as the home switch or virtual Service Switching Point (SSP) for subscribers to existing switch-based services. In operation, the signaling protocol is monitored to detect predetermined triggers and line conditions associated with selected switch-based services. Upon the detection of such predetermined triggers and line conditions, a first electrical signal corresponding thereto is generated for receipt by the service node SCP. Upon receipt, normal call processing is automatically suspended and call handling is transferred to the service node whereupon a second electrical signal is generated prompting the subscriber to select the associated switch-based service. If selected, by the entry of a Dual Tone MultiFrequency (DTMF) signal or other suitable response, the switch-based service will be automatically invoked without the user going off-hook.

8 Claims, 3 Drawing Sheets

METHOD AND SYSTEM FOR AUTOMATICALLY ACCESSING AND INVOKING SWITCH-BASED SERVICES IN AN ADVANCED INTELLIGENT NETWORK

TECHNICAL FIELD

This invention relates generally to Advanced Intelligent Network (AIN) services and, more particularly, to a method and system for automatically invoking existing switch-based services without going off-hook.

BACKGROUND ART

There are currently in existence a number of switch-based services which must be accessed by subscribers off-hook by entering appropriate activation codes. These services include, for example, the Custom Local Access Signaling Services referred to by the acronym CLASS$^{SM}$. For example, Automatic Callback (AC) is a CLASS outgoing call management feature which enables a customer encountering a busy station to perform an activation procedure and have call set-up performed automatically when the called station becomes idle. This feature is directed at customers who need to reach a party that is currently busy and provides the customer with an alternative to automatic redialers and manual, repetitive call attempts. By eliminating trunk, line and equipment seizures until. both parties are found idle, AC has been found to have a positive effect on network resources usage.

The CLASS Automatic Recall (AR) feature works in much the same way as CLASS AC. The main difference, however, is that the AR feature attempts to call a directory number associated with the most recent incoming call received by the customer as opposed to the most recent outgoing call.

Regardless of whether CLASS AC or CLASS AR is selected, or any other switch-based service, heretofore the method of initiation has been the same. Namely, the user must physically go off-hook and take active steps to request initiation of the desired switch-based service through entry of an access code. In fact, to even have an access code, the proposed user must generally be a subscriber to the service sought to be utilized and pay a flat rate fee on a monthly or other periodic basis. As a result, those skilled in the art will recognize that customer usage of such services has generally met with limited success and, in all cases, has not even approached capacity levels.

With the advent of the Advanced Intelligent Network, communications designers may now implement switch-based services directly in the AIN service logic and bypass existing switch-based services. Regrettably, this is a typical approach in the industry, i.e. to completely rewrite service logic to re-implement features which may already exist. This typical approach is both expensive and time-consuming and generally wasteful of existing resources which are available to be tapped.

DISCLOSURE OF THE INVENTION

It is an object of the present invention to overcome the limitations of the prior art by providing a linkage between AIN and existing switch-based services.

A more specific object of the present invention is the provision of a method and system for automatically invoking existing switch-based services in an Advanced Intelligent Network.

Yet another object of the present invention is the provision of a method and system for automatically invoking existing switch-based services in an Advanced Intelligent Network without going off-hook.

In carrying out the above objects, the method and system of the present invention is directed to an Advanced Intelligent Network equipped with O-called-party-busy trigger and leg manipulation functionality and having at least one switch or Service Node (SN) in electrical communication with a plurality of Central Offices (COs) via Transaction Capability Application Part (TCAP) or other suitable signaling protocol. The service node may be operative as the home switch or virtual Service Switching Point (SSP) for subscribers to existing switch-bases services.

In keeping with the invention, the method and system disclosed herein includes monitoring TCAP signaling to detect predetermined triggers and line conditions associated with selected switch-based services. The invention further includes the step of automatically suspending normal call processing upon the detection of these predetermined triggers such that all call handling is transferred to the service node. Thereafter, subscribers are automatically prompted—without going off-hook—to select switch-based services and the services are automatically invoked if selected by the subscriber.

The objects, features and advantages of the present invention are readily apparent from the following detailed description of the best mode for carrying out the invention when taken in connection with the accompanying drawings.

BEST MODE TO CARRY OUT THE INVENTION

Figure 1:
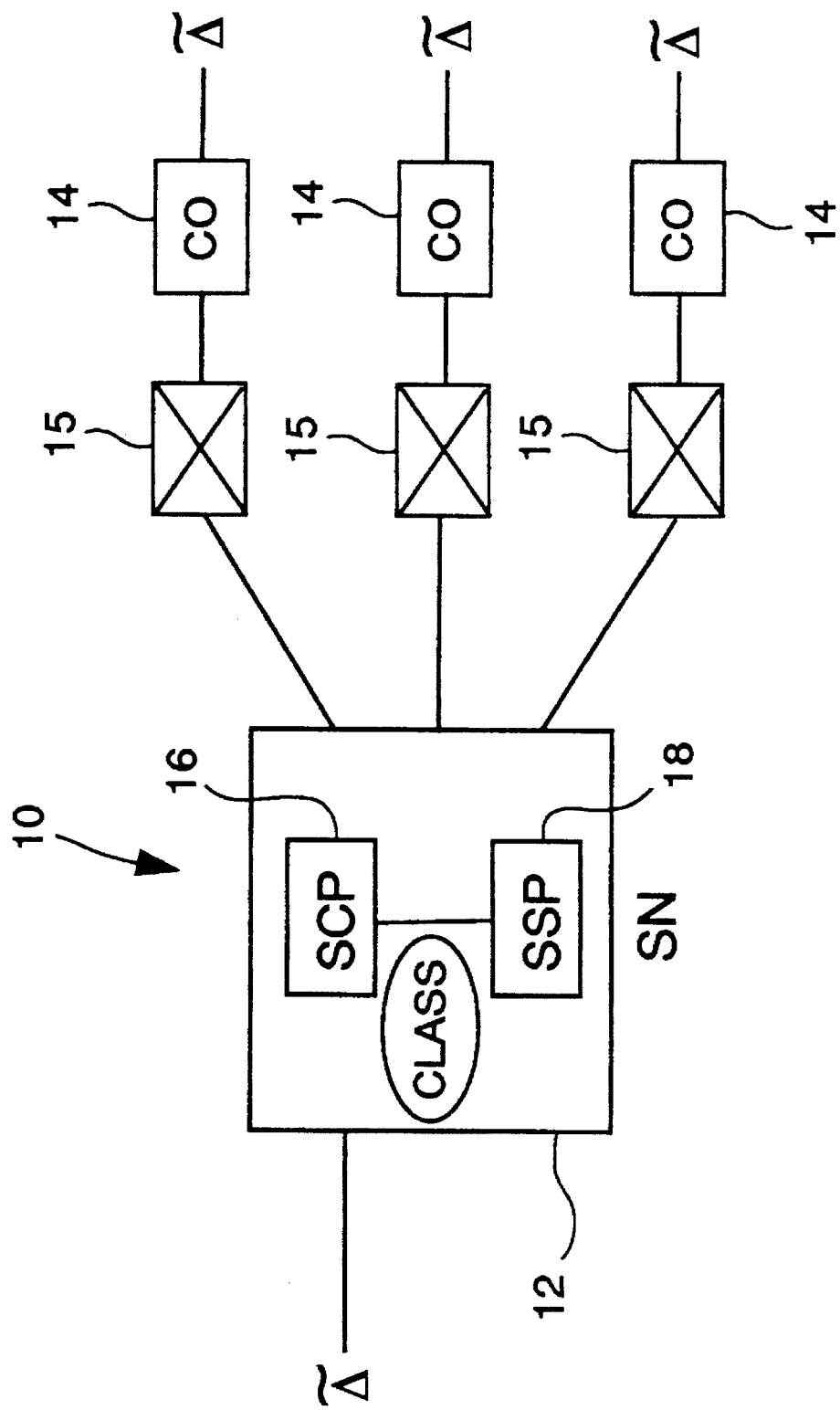
FIG. 1 is a schematic representation of an Advanced Intelligent Network having a release 1.0 service node.

With reference to FIG. 1 of the drawings, a representative diagram of an Advanced Intelligent Network (AIN) architecture is disclosed for use in a Public Switched Telephone Network (PSTN). The AIN architecture referred to is designated generally by reference numeral 10. In the preferred embodiment, the network 10 is equipped with O-called-party-busy trigger and leg manipulation functionality such as, for example, in release 1.0 architecture. Network 10 further includes at least one switch or service node 12 in electrical communication with a plurality of central offices 14 via STP's 15 and Transaction Capability Application Part (TCAP) signaling protocol or other suitable signaling protocol. In the present invention, service node 12 may be operative as the home switch or virtual Service Switching Point (SSP) for subscribers to existing switch-based services. Thus, service node 12 is shown including a Service Control Point (SCP) 16 which contains the service logic and associated data support as well as sufficient memory to execute customer services. Service Node 12 further includes Service Switching Point (SSP) 18 which is a node (usually the subscriber's local switch/central office switch) that recognizes the "triggers" used when a subscriber invokes an intelligent network service and then communicates with the SCP to operate the service. Service switching point 18 and service control point 16 are provided in electrical communication within service node 12 and, may, in some situations, be combined in a single device known as a Service Switching Control Point (SSCP) wherein the functions of the SCP and the SSP are combined.

This basic AIN architecture referenced above is known to those skilled in the art to permit services to be extended throughout the network. In operation, new services are typically installed on two SCP processing platforms for directly servicing a selected market. In operation, this service management system extends management and control to the remote service control points via a signaling network.

While the present invention is directed to any switched-bases services, the preferred services known at the present time are CLASS AC and CLASS AR. As referenced above, those skilled in the art will recognize that the CLASS AC feature enables a customer to place a call to the last station called by the customer. It does not matter whether the last station called by the customer was busy or idle, answered or unanswered. The customer merely completes a predetermined AC activation procedure, and both the busy/idle status and class of service of the called line are checked. If the line is idle and the class of service is permissible, call set-up is attempted. In contrast, if the call cannot be completed immediately because of a busy line, call completion is attempted when both stations are idle. Once AC is activated the busy/idle status of the called and calling lines is checked periodically until call set-up is attempted or a time out occurs. The customer and the called party may originate and receive calls without affecting the AC feature status. A customer may similarly have multiple AC activations in effect concurrently.

As also referenced above, the AC and AR CLASS features are very similar. The AC feature attempts to call the directory number associated with the most recent outgoing call by the customer. This directory number is obtained from the outgoing memory slot. The AR feature, in contrast, attempts to call the directory number associated with the most recent incoming call received by the customer. This directory number is obtained from the incoming memory slot.

Currently, Bellcore Client Companies (BCCs) have the option to offer AR activation as a one or two level procedure. In contrast, AC activation occurs as a one-level procedure only. In the one-level procedure, the selected feature is activated after the subscriber successfully dials the proper access code. When AR activation occurs as a two-level procedure, the customer first dials an access code as in the one-level procedure. Once this code is successfully dialed, the customer hears an announcement regarding the directory number associated with the most recent incoming call received by the customer, i.e. the directory number that exists in the incoming memory slot. The customer is then instructed to dial a digit to activate AR, or hang-up to abort AR. AC and AR activation procedures are identical with exception of the deactivation codes. All outstanding AC or AR requests are deactivated once the subscriber successfully dials the proper deactivation code. This deactivation procedure must, like the activation procedure, however, be done off-hook.

To implement these existing switch-based features while dispensing with the requirement that the user go off-hook, applicants have developed the method and system herein disclosed which makes specific use of an Advanced Intelligent Network having the appropriate triggers and leg manipulation functionality to automate the above procedure.

Figure 2:
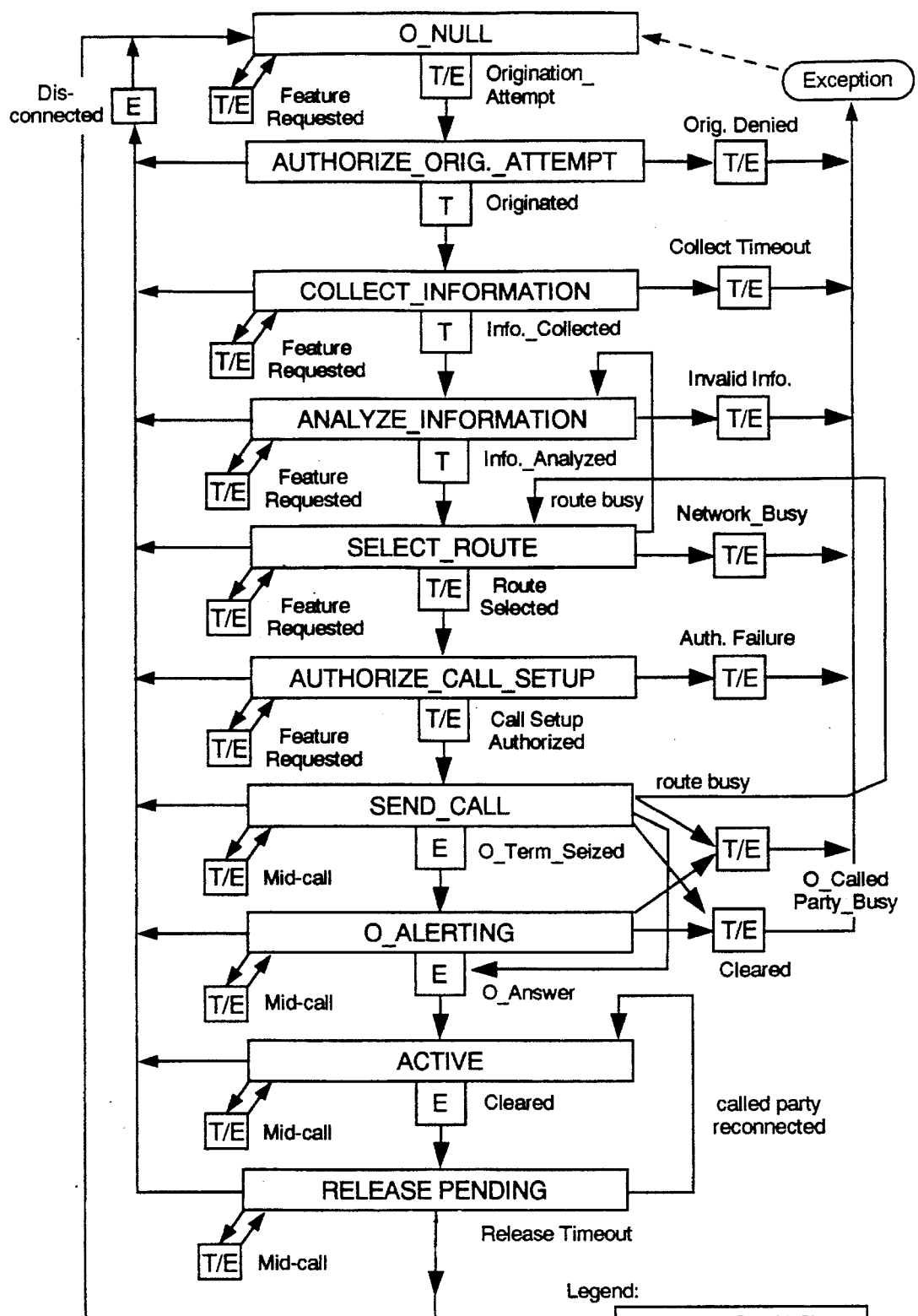
FIG. 2 is a schematic representation of a call model for a release 1.0 service node.

With reference to FIG. 2 of the drawings, there is shown a typical call model for an AIN release 1.0 architecture. As those skilled in the art will recognize, an AIN release 1.0 service node is a switch that can recognize a call that requires AIN 1.0 processing by an SCP, without making any assumptions about the service being provided. The switch does so by temporarily suspending call processing, and assembling and launching a query to the SCP. The subsequent SCP reply gives the switch information on how to continue processing the call. Similarly, triggering is the process of identifying calls that need AIN handling. Upon encountering a trigger, a service node suspends normal call processing and moves to the next step, code gapping. The service node and AIN 1.0 supports several types of triggers which may be detected at the trigger detection points identified in the two-part call model of FIG. 2. The most important trigger to the present invention, as referenced above, is the O-called-party-busy trigger which is necessary for implementation of switch-based services within AIN.

Figure 3:
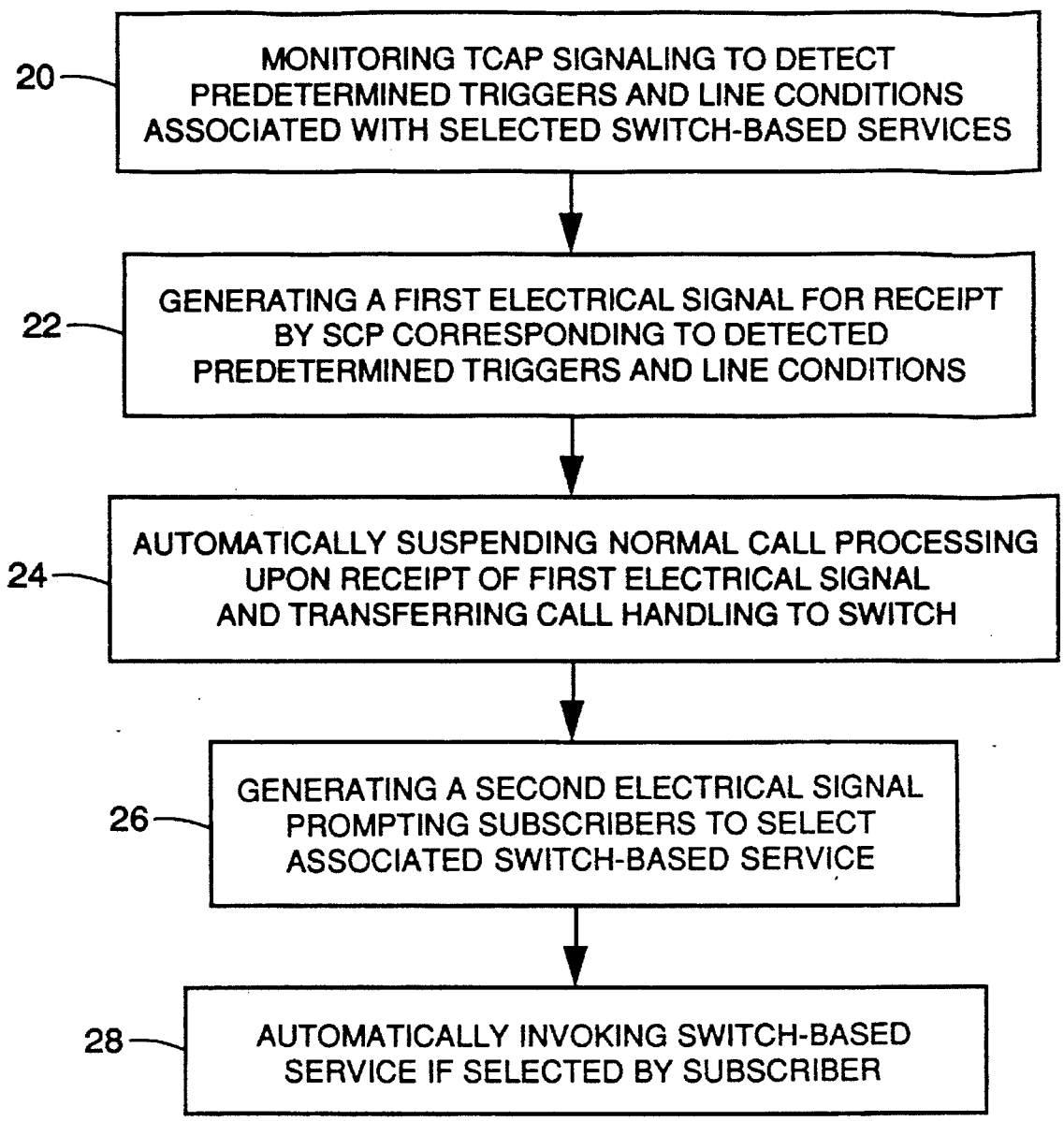
FIG. 3 is a flow diagram of the method steps of the present invention.

Referring to FIG. 3 of the drawings, the method and system of the present invention is further detailed and includes the monitoring 20 of the Transaction Capability Application Part signaling to detect predetermined triggers and line conditions associated with selected switch-based services. Such conditions are generally related to the called party line and must be monitored to determine if a switch-based service may be implemented. For example, CLASS automatic call-back may only implemented under the following conditions: (1) the called line does not have Call Forwarding Variable active, or have the calling party on the acceptance list for an active Selective Call Acceptance (SCA) feature with the forwarding option; (2) the called line does not have Selected Call-Forwarding (SCF) active for the calling party; (3) the called line is not denied termination; (4) CCS connectivity exists between the originating and terminating offices; (5) the called line service type and Directory Number() match indicators are acceptable; and (6) system facilities are currently available.

If, following monitoring of the TCAP signaling, the predetermined trigger and line conditions associated with a selected switch-based service are detected, a first electrical signal corresponding thereto is generated 22 for receipt by the SCP. Following such receipt, normal call processing will be automatically suspended 24 and call handling will be transferred to service node 12. Thereafter, the subscriber will be automatically prompted 26 via a second electrical signal to make a selection decision regarding the use of the corresponding switch-based service. This signal may be in the form of an oral announcement or other similar feature and, based on the subscriber's response, the feature will be automatically invoked 28 or normal call processing will return.

As an example, consider the situation where a subscriber has attempted to complete a telephone call, yet has been unable to do so because the called party telephone is in use. If, the required triggers and line conditions associated with this switch-based service, i.e. CLASS AC, are detected upon monitoring of the network signaling protocol, a first electrical signal will be generated by SN 12 for receipt by an SCP corresponding to the detected predetermined triggers and line conditions. As referenced above, the SCP must be provided as a component of a service node or other suitable switch operative as the home switch or virtual Service Switching Point (SSP) for the subscriber to the CLASS AC service. Following receipt of this electrical signal, normal call processing will be automatically suspended and call handling will be transferred to the service node. Thereafter, a second electrical signal prompting the user to select the CLASS AC will be generated by SN 12. If the user desires to select the service for which the request was generated, a DTMF (Dual Tone Multi-Frequency) tone may be entered, thereby generating a third electrical signal for receipt by the SCP. Upon receipt of an analysis of this signal by the SCP, the corresponding switch-based service will be automatically invoked.

Significantly, the above procedure, which is representative of any switch-based service desired to be invoked, is accomplished without the user going off-hook and initiating a time-consuming and complex activation procedure.

While the best mode for carrying out the invention has been described in detail, those familiar with the art to which this invention relates will recognize various alternative designs and embodiments for practicing the invention as defined by the following claims.

What is claimed is:

1. For use in an Advanced Intelligent Network (AIN) equipped with O-Called-Party-Busy trigger and leg manipulation functionality and having at least one switch and a Service Control Point (SCP) in electrical communication with a plurality of central offices via Transaction Capability Application Part (TCAP) signaling protocol, said switch operative as a virtual Service Switching Point (SSP) for subscribers to existing switch-based services, a method for automatically accessing and invoking said switch-based services without going off-hook, comprising:

monitoring said TCAP signaling to detect predetermined triggers and line conditions associated with selected switch-based services;

generating a first electrical signal for receipt by said SCP corresponding to said detected predetermined triggers and line conditions;

automatically suspending normal call processing upon receipt of said first electrical signal and transferring call handling to said switch;

generating a second electrical signal prompting subscribers to select said associated switch-based service; and automatically invoking said switch-based service if selected by said subscriber.

2. The method of claim 1, further comprising generating a subscriber initiated electrical signal for receipt by said SCP indicating said subscriber's service selection decision; and analyzing said subscriber initiated electrical signal.

3. The method of claim 1, wherein said AIN has Release 1.0 functionality.

4. The method of claim 1, wherein said existing switch based services comprise Custom Local Access Signaling Services (CLASS).

5. For use in an Advanced Intelligent Network (AIN) equipped with O-Called-Party-Busy trigger and leg manipulation functionality and having at least one service node and a Service Control Point (SCP) in electrical communication with a plurality of central offices via Transaction Capability Application Part (TCAP) signaling protocol, said service node operative as a virtual Service Switching Point (SSP) for subscribers to existing switch-based services, a method for automatically accessing and invoking said switch-based services without going off-hook, comprising:

monitoring said TCAP signaling to detect predetermined triggers and line conditions associated with selected switch-based services;

generating a first electrical signal for receipt by said SCP corresponding to said detected predetermined triggers and line conditions;

automatically suspending normal call processing upon receipt of said first electrical signal and transferring call handling to said service node;

generating a second electrical signal prompting said subscriber to select said associated switch-based service;

generating a subscriber initiated electrical signal in response to said second electrical signal and for receipt by said SCP corresponding to said subscriber's selection decision;

analyzing said subscriber initiated electrical signal; and automatically invoking said switch-based service selected by said subscriber.

6. For use in an Advanced Intelligent Network (AIN) equipped with O-Called-Party-Busy trigger and leg manipulation functionality and having at least one service node in electrical communication with a plurality of central offices via Transaction Capability Application Part (TCAP) signaling protocol, said service node operative as a virtual Service Switching Point (SSP) for subscribers to existing switch-based services, a method for automatically accessing Custom Local Access Signaling Services (CLASS) Automatic Callback (AC), without going off-hook so as to effect communication between participating stations, comprising:

monitoring said TCAP signaling to detect said O-Called-Party-Busy trigger and predetermined line conditions necessary to invoke said CLASS AC feature;

generating a first electrical signal for receipt by said SCP corresponding to said detected trigger and line conditions;

automatically suspending normal call processing upon receipt of said first electrical signal and transferring call handling to said service node;

obtaining the Directory Number (DN) associated with the most recent outgoing call by said subscriber;

generating a second electrical signal prompting said subscriber to select said CLASS AC feature; and automatically invoking said CLASS AC feature if selected such that call completion may be attempted when said participating stations are idle.

7. For use in an Advanced Intelligent Network (AIN) equipped with O-Called-Party-Busy trigger and leg manipulation functionality and having at least one service node in electrical communication with a plurality of central offices via Transaction Capability Application Part (TCAP) signaling protocol, said service node operative as a virtual Service Switching Point (SSP) for subscribers to existing switch-based services, a method for automatically accessing Custom Local Access Signaling Services (CLASS) Automatic Recall (AR), without going off-hook so as to effect communication between participating stations, comprising:

monitoring said TCAP signaling to detect said O-Called-Party-Busy trigger and predetermined line conditions necessary to invoke said CLASS AC feature;

generating a first electrical signal for receipt by said SCP corresponding to said detected trigger and line conditions;

automatically suspending normal call processing upon receipt of said first electrical signal and transferring call handling to said service node;

obtaining the Directory Number (DN) associated with the most recent incoming call to said subscriber;

prompting said subscriber to select said CLASS AR feature; and automatically invoking said CLASS AR feature if selected such that call completion may be attempted when said participating stations are idle.

8. For use in an Advanced Intelligent Network (AIN) equipped with O-Called-Party-Busy trigger and leg manipulation functionality and having at least one switch and a Service Control Point (SCP) in electrical communication with a plurality of central offices via Transaction Capability Application Part (TCAP) signaling protocol, said switch operative as a virtual Service Switching Point (SSP) for subscribers to Custom Local Access Signaling Services (CLASS), including Automatic Recall and Automatic Callback Services, a method for automatically accessing and invoking said Automatic Recall or Automatic Callback Services without going off-hook, comprising:

monitoring said TCAP signaling to detect predetermined triggers and line conditions associated with invoking said Automatic Recall and Automatic Callback Services;

generating a first electrical signal for receipt by said SCP corresponding to said detected predetermined triggers and line conditions;

automatically suspending normal call processing upon receipt of said first electrical signal and transferring call handling to said switch;

generating a second electrical signal prompting said subscriber to select said Automatic Recall or Automatic Callback Services; and automatically invoking said Automatic Recall or Automatic Callback Services if selected by said subscriber.

* * * * *

UNITED STATES PATENT AND TRADEMARK OFFICE
CERTIFICATE OF CORRECTION

PATENT NO. : 5,479,495
DATED : December 26, 1995
INVENTOR(S) : Mark S. Blumhardt It is certified that error appears in the above-indentified patent and that said Letters Patent is hereby corrected as shown below:

Column 1, line 27: After "until" delete "."

Column 4, line 33: Delete "termination" and insert --terminating--,

Column 4, line 36: After "line" insert --is-- as

Column 4, line 43: Delete "the" and insert --said--

UNITED STATES PATENT AND TRADEMARK OFFICE
CERTIFICATE OF CORRECTION

PATENT NO. : 5,479,495
DATED : December 26, 1995
INVENTOR(S) : Mark S. Blumhardt It is certified that error appears in the above-indentified patent and that said Letters Patent is hereby corrected as shown below:

Column 2, line 14
Delete "switch-bases" and insert --switch-based--.

Column 3, line 14
Delete "switched-bases" and insert --switched-based--.

Column 4, line 28          After
"only" insert --be--.

Signed and Sealed this

Ninth Day of July, 1996

BRUCE LEHMAN

Commissioner of Patents and Trademarks